United States Patent
Kleinschmidt et al.

(10) Patent No.: US 6,792,023 B1
(45) Date of Patent: Sep. 14, 2004

(54) METHOD AND APPARATUS FOR REDUCTION OF SPECTRAL FLUCTUATIONS

(75) Inventors: Juergen Kleinschmidt, Weissenfels (DE); Peter Lokai, Goettingen (DE); Konstantin Aab, Kassel (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 10/112,660

(22) Filed: Mar. 28, 2002

Related U.S. Application Data

(60) Continuation-in-part of application No. 09/924,814, filed on Aug. 7, 2001, now Pat. No. 6,477,187, which is a division of application No. 09/317,695, filed on May 24, 1999, now Pat. No. 6,345,065.
(60) Provisional application No. 60/281,433, filed on Apr. 3, 2001, provisional application No. 60/126,435, filed on Aug. 18, 1998, and provisional application No. 60/155,188, filed on Jun. 4, 1998.

(51) Int. Cl.$^7$ ................................................. H01S 3/06
(52) U.S. Cl. .......................................... 372/57; 372/59
(58) Field of Search .................... 372/38.1, 60, 104, 372/57, 58, 59, 61, 20, 25, 9

(56) References Cited

U.S. PATENT DOCUMENTS

| | | | |
|---|---|---|---|
| 5,396,514 A | * | 3/1995 | Voss ............................ 372/57 |
| 5,404,366 A | * | 4/1995 | Wakabayashi et al. ......... 372/9 |

(List continued on next page.)

FOREIGN PATENT DOCUMENTS

| | | | | |
|---|---|---|---|---|
| WO | WO 01/18923 A1 | 3/2001 | ............. | H01S/3/22 |
| WO | WO 01 59889 A1 | 8/2001 | ............. | H01S/3/08 |

OTHER PUBLICATIONS

In re Provisional Patent Application No. 60/170,919, filed Dec. 15, 1999, by Jurgen Kleinschmidt et al., entitled "Line Selection Using a Grism Output Coupler," 14 pages in length.
In re U.S. patent application No. 10/141,625, filed May 7, 2002, by Kay Zimmerman et al., entitled "Line–Narrowing Optics Module Having Improved Mechanical Performance," 56 pages in length.
In re U.S. patent application No. 09/602,184, filed Jun. 22, 2000, by Juregen Kleinschmidt et al., entitled "Narrow Band Excimer Laser with a Prism–Grating as Line–Narrowing Optical Element," 39 pages in length.

*Primary Examiner*—Don Wong
*Assistant Examiner*—Tuan N. Nguyen
(74) *Attorney, Agent, or Firm*—Stallman & Pollock LLP

(57) ABSTRACT

An excimer or molecular fluorine laser system includes a laser chamber filled with a gas mixture at least including a halogen-containing species and a buffer gas, multiple electrodes, including a pair of main discharge electrodes and at least one preionization electrode, within the laser chamber and connected to a discharge circuit for energizing the gas mixture, and a resonator including a line-narrowing and/or selection module for generating a laser beam at high spectral purity. The line-narrowing module includes one or more line-narrowing and/or selection optics within a sealed module coupled to vacuum equipment through a vacuum port for reducing the pressure within the module,

35 Claims, 5 Drawing Sheets

U.S. PATENT DOCUMENTS

| | | | |
|---|---|---|---|
| 5,684,822 A | * 11/1997 | Partlo | 372/95 |
| 5,856,991 A | * 1/1999 | Ershov | 372/57 |
| 5,901,163 A | * 5/1999 | Ershov | 372/20 |
| 5,982,800 A | * 11/1999 | Ishihara et al. | 372/57 |
| 5,991,324 A | * 11/1999 | Knowles et al. | 372/57 |
| 6,014,398 A | * 1/2000 | Hofmann et al. | 372/60 |
| 6,018,537 A | * 1/2000 | Hofmann et al. | 372/25 |
| 6,101,211 A | 8/2000 | Wakabayashi et al. | 372/102 |
| 6,128,323 A | * 10/2000 | Myers et al. | 372/38.1 |
| 6,154,470 A | 11/2000 | Basting et al. | 372/19 |
| 6,192,064 B1 | * 2/2001 | Algots et al. | 372/99 |
| 6,240,110 B1 | * 5/2001 | Ershov | 372/20 |
| 6,476,987 B1 | 11/2002 | Kleinschmidt et al. | 359/837 |
| 6,522,681 B1 | 2/2003 | Kleinschmidt | 372/108 |
| 6,526,086 B1 | 2/2003 | Wakabayashi et al. | 372/69 |
| 6,603,789 B1 | 8/2003 | Kleinschmidt | 372/57 |
| 2001/0014110 A1 | 8/2001 | Partlo et al. | 372/100 |
| 2002/0006147 A1 | 1/2002 | Cybulski et al. | 372/55 |
| 2002/0034208 A1 | 3/2002 | Titus et al. | 372/102 |
| 2002/0127497 A1 | 9/2002 | Brown et al. | 430/321 |

* cited by examiner $\theta = hR$
oa = optical axis $h' = M * h$
$\theta' = \theta/M$
$R' = M^2 * R$

METHOD AND APPARATUS FOR REDUCTION OF SPECTRAL FLUCTUATIONS

PRIORITY

This application claims the benefit of priority to U.S. provisional patent application No. 60/281,433, filed Apr. 3, 2001, and is a Continuation-in-Part application which claims the benefit of priority to U.S. patent application Ser. No. 09/924,814, filed Aug. 7, 2001 now U.S. Pat. No. 6,477,187, which is a divisional of Ser. No. 09/317,695 filed May 24, 1999 now U.S. Pat. No. 6,345,065, and issued Feb. 5, 2002, which claims priority to U.S. provisional patent applications No. 60/126,435, filed Aug. 18, 1998 and 60/155,188, Jun. 4, 1998. each patent and patent application being hereby incorporated by reference.

BACKGROUND OF THE INVENTION

1. Field of the Invention

The invention relates to excimer and molecular fluorine laser systems, and particularly to line-narrowed systems for producing high spectral purity laser beams.

2. Discussion of the Related Art

Efficient transport of sub-200 nm radiation is complicated by strong absorption by photoabsorbing species such as water vapor and oxygen that are abundant in ambient air. That is, a sub-200 nm beam of radiation will propagate a certain distance along an beam path before it is substantially extinguished by absorptive losses due to any photoabsorbing species such as water, oxygen and hydrocarbons located along the beam path. For example, an extinction length (1/e) for 157 nm radiation emitted by the $F_2$-laser is less than a millimeter in ambient air.

High intracavity losses also occur for lasers operating at wavelengths below 200 nm, again due particularly to characteristic absorption by oxygen and water, but also due to scattering in gases and all optical elements. As with the absorption, the short wavelength (less than 200 nm) is responsible for high scattering losses due to the wavelength dependence of the photon scattering cross section.

These complications from absorption and scattering are much less of a problem for lithography systems employing 248 nm light, such as is emitted by the KrF-excimer laser. Species such as oxygen and water in the cavity and atmosphere which absorb strongly below 200 nm, and specifically very strongly around 157 nm for the $F_2$ laser, and which also absorb radiation around 193 nm for the ArF laser, exhibit negligible absorption at 248 nm. The extinction length in ambient air for 248 nm light is substantially more than ten meters. Also, photon scattering in gases and optical elements is reduced at 248 nm compared with that occurring at shorter wavelengths. In addition, output beam characteristics are more sensitive to temperature-induced variations effecting the production of smaller structures lithographically at short wavelengths such as 157 nm, than those for longer wavelength lithography at 248 nm. Clearly, KrF excimer lasers do not have the same level of problems since the 248 nm light scatters less and experiences less absorption. Due to their continued importance for industrial applications, it is still desired to achieve improved spectral purity 248 nm beams, in addition to improved spectral purity sub-200 nm beams, such as 193 nm and 157 nm beams.

One way to deal with the absorption problems of the 157 nm emission of the $F_2$ laser, and generally for sub-200 nm radiation, is sealing the beam path with a housing or enclosure and purging the beam path with an inert gas. However, if a flow of purge gas is used in this technique to remove absorbing species from the beam enclosure, then turbulence and gas density fluctuations can tend to distort the wavefront and reduce the spectral purity. In addition, it may also be necessary to perform this purging technique with a very clean inert gas, e.g., containing less than 1 ppm of absorbing species such as water and oxygen. Commercial ultra high purity (UHP) grade gases may be obtained to satisfy these purity requirements at increased cost. Overall, this purging approach is expensive and inconvenient, and may still not provide the degree of spectral purity that is desired.

Another consideration is the energy stability. It is desired to maintain laser energy dose variations, and/or energy moving average variations, to less than, e.g., 0.5% or better. If residual oxygen or water vapor partial pressures fluctuate by 0.5% to 1.0%, e.g., then fluctuations in the absorption of the beam by these species could cause the energy dose stability to fall below desired or even tolerable levels. It is recognized in the present invention that a first step of lowering the partial pressures of photoabsorbing species along the laser beam path would serve to lower the % absorption fluctuation and increase the energy dose stability, even if the % concentrations of these species fluctuate at the same % value. It is desired, then, to have a technique for preparing the beam path of a DUV/VUV laser such that absorption and absorption fluctuations of the beam along the beam path are low enough to meet energy dose stability criteria, e.g., of <0.5%. It is desired to lower the residual pressure of the absorbing species substantially below 100 milliTorr to reduce both optical losses, e.g., to less than around 1% per meter of optical path length, and optical loss fluctuations.

Purge gases (e.g., $N_2$, He, Ar, etc.) may be used in industrial lasers such as ArF and $F_2$ lasers for reducing the level of photoabsorbing species. Use of purge gases in optical modules of these laser resonators as well as KrF laser resonators, such as line-narrowing modules, may be used further to reduce ozone formation in these line-narrowing modules. Even though use of purge gases may be used for these purposes, it is recognized in the present invention that there still exists a comparatively fast effect that is not satisfactorily compensated by use of purge gases in line-narrowing modules, even at low purge flow rates. That effect relates to refractive index fluctuations due to gas density fluctuations in the purge gas inside of the line-narrowing module. It is desired to have a better way to reduce ozone formation in line-narrowing modules for industrial lasers such as KrF lasers, and that preferably also serves to reduce concentrations and concentration fluctuations of photoabsorbing species particularly for sub-200 nm systems such as ArF and $F_2$ lasers, wherein gas density fluctuations producing refractive index fluctuations are also below levels produced by systems that would use purge gas flows in the line-narrowing modules.

SUMMARY OF THE INVENTION

An excimer or molecular fluorine laser system includes a laser chamber filled with a gas mixture at least including a halogen-containing species and a buffer gas, multiple electrodes, including a pair of main discharge electrodes and at least one preionization electrode, within the laser chamber and connected to a discharge circuit for energizing the gas mixture, and a resonator including a line-narrowing and/or selection module for generating a laser beam at high spectral purity. The line-narrowing module includes one or more line-narrowing and/or selection optics within a sealed module coupled to vacuum equipment through a vacuum port for reducing the pressure within the module, According to one embodiment, the pressure is maintained to not greater than 80 mbar such that refractive index fluctuations due to density fluctuations of gases in the module are substantially suppressed and for suppressing absorption by contaminant species in the beam path. The one or more line-narrowing optics may include one or more of a grating, beam expander, e.g., including one or more prisms for expanding the beam, an interferometric device, and/or one or more apertures on either side of the laser chamber. The vacuum port may be continuously open to the line-narrowing module to maintain the pressure not higher than 80 mbar, and/or the line-narrowing module may include a vacuum-tight block.

According to another embodiment, the pressure is maintained to not greater than 5 mbar such that refractive index fluctuations due to density fluctuations of gases in the module are substantially suppressed and for suppressing absorption by contaminant species in the beam path. The one or more line-narrowing and/or selection optics may include a grating, beam expander, interferometric device and/or wavefront compensation optic. The interferometric device may be an etalon or a device having non-plane-parallel plates. Refractive index fluctuations are preferably maintained less than $10^{-6}$.

According to another embodiment, the pressure is maintained to not greater than $10^{-3}$ mbar such that refractive index fluctuations due to density fluctuations of gases in the module are substantially suppressed and for suppressing absorption by contaminant species in the beam path. An extra-cavity beam enclosure may have a prepared atmosphere for suppressing absorption by contaminant species in the extra-cavity beam path. A galvanic separation component, e.g., made of ceramic, may be disposed along the extra-cavity beam enclosure. Further enclosures between the laser chamber and each of the line-narrowing module and an output coupler of the laser resonator may be used to maintain corresponding beam paths substantially free of photoabsorbing species. The enclosures may comprise metal bellows as anti-vibration and pressure-sealing hardware. The laser system may be a $F_2$ laser system and the one or more line-narrowing and/or selection optics for selecting one of multiple closely-spaced lines around 157 nm. These optics may include one or more of an interferometric device, dispersive prism, beam expander, etc.

According to another embodiment, at least one of the one or more line-narrowing and/or selection optics is rotated by a lever which is moved by a motor drive which feeds through to move the lever by a bellow and otherwise sealed feedthrough to prevent contaminants from entering the line-narrowing and/or selection module. The one or more line-narrowing and/or selection optics are selected from the group consisting of a grating, a beam expander, an interferometric device and a wavefront compensation optic. This embodiment may be combined with any of the above embodiments to form an advantageous line-narrowed laser system.

INCORPORATION BY REFERENCE

Figure 1:
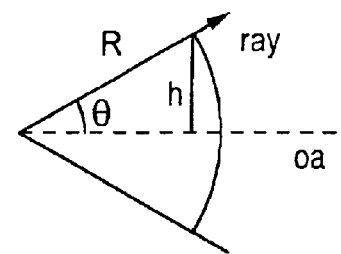
FIG. 1 illustrates a wavefront of a laser beam without beam expansion.

What follows is a cite list of references each of which is, in addition to the background, invention summary and brief description of the drawings above, and any references in the background, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 6,061,382, 6,081,542, 5,559,816, 6,298,080, 6,345,065, 6,327,290, 5,761,236, 6,212,217, 4,616,908, 5,051,558, 5,221,823, 5,440,578, 5,450,436, 5,559,584, 5,590,146, 5,763,855, 5,811,753, 6,219,368, and 6,154,470; and U.S. published patent application No. 20020006147; and U.S. patent application Ser. Nos. 09/712,877, 09/598,552, 09/727,600, 09/131,580, 09/602,184, 09/599,130, 09/629,256, 09/640,595, 09/694,246, 09/771,366, 09/738,849, 09/715,803, 09/712,367, 09/717,757, 09/843,604, 09/584,420, 09/883,127, 09/883,128, 09/657,396, and 09/883,097, which are assigned to the same assignee as the present application; and WO 01/18923; and EP 1 017 086 A1; and

JP 2,696,285.

DETAILED DESCRIPTION OF THE PREFERRED EMBODIMENTS

The preferred embodiments provide substantial improvements of laser bandwidth fluctuations using an evacuatable line-narrowing module (e.g., including a grating or other dispersive element and a prism beam expander module) with an excimer or molecular fluorine laser for industrial applications such as photolithography, mask writing, mask inspection and/or wafer inspection. Evacuating the line-narrowing module, e.g., to 80 mbar or below, and preferably below 5 mbar, reduces purge gas density fluctuations and thereby reduces laser bandwidth fluctuations. Among the preferred embodiments are KrF (248 nm), ArF (193 nm) and molecular fluorine (157 nm) lasers, and potentially EUV (11 nm–15 nm) systems, and even tunable solid-state lasers or dye lasers.

Industrial lasers of the kind mentioned just above are applied notably in photolithography for production of integrated circuits, and are also used for reticle writing and inspection and IC inspection. Wavelengths below 250 nm may be used for making structures in the dimensional range of 0.25 $\mu$m or less. Wavelengths bellow 200 nm may be used for making structures in the dimensional range of 0.18 $\mu$m to 0.13 $\mu$m or less. Achromatic imaging optics for these wavelength regions are difficult to produce for production of such structures while preventing imaging errors caused by chromatic aberration. Therefore, acceptable bandwidths for refractive imaging optics are less than 1 pm, and may be typically in the range 0.6 pm to 0.3 pm.

Another important beam parameter is spectral purity which is the wavelength interval which contains 95% of the pulse energy. The bandwidth and in a higher degree the spectral purity are determined by the divergence $\theta$ or by the wavefront curvature R of the beam (see FIGS. 1–5 below). To reduce the divergence and the wavefront curvature in front of the bandwidth narrowing element or dispersive element (e.g., grating) of the line-narrowing optics within the line-narrowing module of the laser system, a beam expander (e.g., a prism beam expander, see FIG. 3) is preferably located before the dispersive element and provides an expansion factor M of the beam.

Referring now to FIG. 1, a laser beam has a divergence defined by $\theta$ which generally depends on the angle that the outer most rays of the beam make with the propagation axis of the beam. At some point along the beam path, the width (or height) of the beam may be defined as h. The wavefront curvature is defined by an effective radius of curvature R of the wavefront. Because the angle $\theta$ for an industrial laser beam is relatively small, then the divergence $\theta$ may be nearly $\theta \approx h/R$, as illustrated at FIG. 1.

Figure 2:
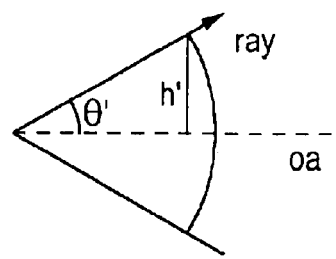
FIG. 2 illustrates the wavefront of the laser beam of FIG. 1 with beam expansion and correspondingly reduced divergence.

FIG. 2 illustrates what happens to the laser beam of FIG. 1 after passing through a beam expander of magnification M. The beam width h is multiplied by the magnification M of the beam expander, i.e.:

$$h'=M \cdot h.$$

The divergence $\theta$ is correspondingly divided by the magnification M, i.e.:

$$\theta'=\theta/M.$$

The wavefront curvature of the expanded beam (for an ideal beam expander) is then:

$$R'=h'/\theta'=M^2 \cdot (h/\theta)=M^2 \cdot R.$$

The wavefront curvature is advantageously reduced by a factor of $M^2$. The wavefront curvature R' in front of a flat grating is infinite. However, the light behind the beam expander has a curved wavefront because of several reasons including (1) rays which are not parallel to the optical axis are amplified along with the parallel rays in the cavity, (2) deviations from planar surfaces in the optical components, (3) refractive index changes in the volume of the optical components, and (4) radiation-induced refractive index changes in the volume of the optical components.

In accordance with the above, improved spectral purity may be achieved by correcting or compensating the curvature of the wavefront. Some techniques for correcting wavefront curvature are described at U.S. Pat. No. 6,061,382 and U.S. patent application Ser. Nos. 09/843,604 and 10/035,351, which are assigned to the same assignee as the present application, each of these three patent documents being hereby incorporated by reference. Neither the advantageous beam expander nor wavefront compensating optic or optics of the preferred embodiment sufficiently compensates for the relatively fast effect of refractive index fluctuations due to density fluctuations in the gas inside of the bandwidth narrowing module which tends to degrade the spectral purity.

Figure 3:
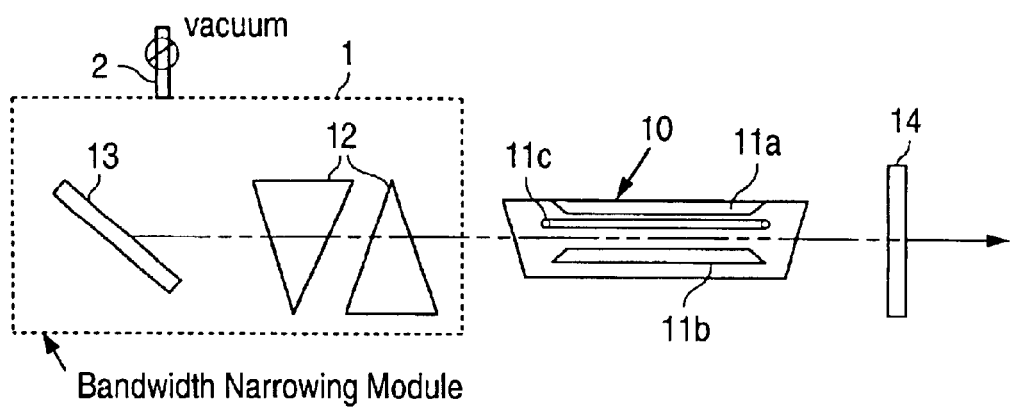
FIG. 3 generally illustrates an industrial laser resonator in accordance with a preferred embodiment.

In view of this effect of purge gas density fluctuations that produce fluctuations in the refractive index of the purge gas within a line-narrowing module and tending to degrade the spectral purity of the beam passing through it, the resonator schematically illustrated at FIG. 3 is provided in accord with a preferred embodiment. The resonator of FIG. 3 advantageously features a line-narrowing module 1 connected to a vacuum port 2 for evacuating the interior of the module 1 to a pressure of less than 80 mbar, and preferably less than 5 mbar, and more preferably 50–200 milliTorr or less, and still better, less than around $10^{-3}$ mbar or 0.5 milliTorr or less, wherein the pressure to be used in any particular embodiment will depend on the requirements of the application to which the laser system is to be used. The resonator of FIG. 3 further includes a laser tube 10 filled with a gas mixture and having a pair of main electrodes 11a, 11b and preferably at least one preionization electrode 11c, each connected to a discharge circuit for energizing the gas mixture, a beam expander 12 and dispersion element 13, e.g., a grating, one or more dispersion prisms and/or an interferometric device, and an output coupler 14. Features of the preferred laser system are set forth in more detail below with reference to FIG. 8.

Figure 4:
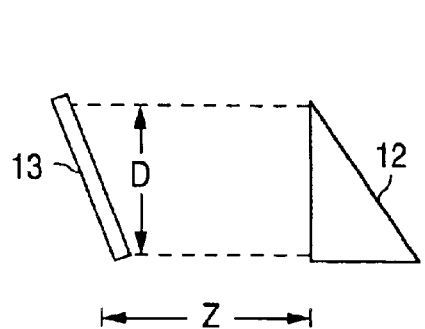
FIG. 4 illustrates a beam propagating between a beam expander and a dispersive element, such as a grating, prism or interferometric device, of a line-narrowing unit according to a preferred embodiment.

FIG. 4 illustrates a beam propagating between a final prism of a beam expander 12, which may include multiple prisms, and alternatively other beam expanding elements such as a lens or lenses, reflective optics, etc., and a dispersive element 13, such as a grating, prism or interferometric device, of a line-narrowing unit according to a preferred embodiment. The beam is expander to a diameter D and there is a distance Z between the final prism of the beam expander 12 and the dispersive element 13.

Figure 5:
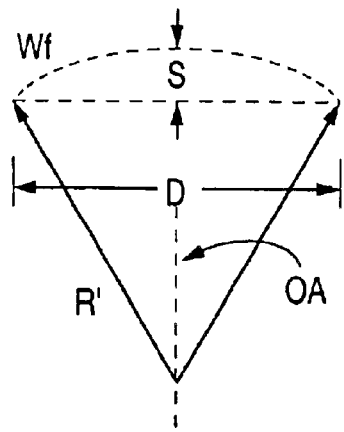
FIG. 5 illustrates a beam just prior to being incident at a dispersive element of a line-narrowing unit according to a preferred embodiment.

FIG. 5 illustrates a beam just prior to being incident at a dispersive element (not shown in FIG. 5) of a line-narrowing unit according to a preferred embodiment. The beam has been magnified by a beam expander and has a radius of curvature R' as described above with reference to FIG. 2. The beam has a diameter D near the grating and the wavefront at the center leads the wavefront at the edges of the beam cross-section, with respect to the beam propagation axis oa, by a distance S.

We desire to provide an averaged amplitude of optical path fluctuations $\Delta n \cdot z \ll s$. With $s \sim D^2/(8 \cdot R')$ (see FIGS. 4 and 5) and if we use some exemplary numbers, e.g., $R' \sim 500$ m, $D \sim 50$ mm, $Z=150$ mm to 300 mm, then $\Delta n$ would be perhaps around $10^{-6}$ or less if the above condition is to be fulfilled.

Taking into consideration, that the refractive index n of the purge gas (e.g., $N_2$) is approximately given by:

$$n=1+(n_0-1) \cdot \rho/\rho_0$$

where $n_0$ is the refractive index at standard conditions, $\rho_0$ is the gs density at standard conditions, where standard conditions are, e.g., 1 bar and 0° C., then $(n_0-1)=0.0003$ for $N_2$). The above formula gives:

$$\Delta n = (n_0-1) * \Delta\rho/\rho_0$$

The maximum fluctuation $\Delta\rho$ of the gas density may be approximately given by the gas density $\rho$ itself. In this case, $\Delta n<(n_0-1)*\rho/\rho_0$ and with $\rho/\rho_0<0.005$ (p<5 mbar), the above desired condition $\Delta n<10^{-6}$ can be advantageously fulfilled.

Thus, in accord with a preferred embodiment, reductions of fluctuations of the laser radiation spectrum using an evacuatable line-narrowing module (e.g., grating/prism expander module in excimer laser used in the photolitography applications) are advantageously achieved. A specifically preferred embodiment includes an ArF excimer laser including an evacuatable narrow-band tuning module including a grating and a prism beam expander with or w/o phase front correction optic(s). The grating may be disposed with a blaze angle between 78° and 82°, and particularly around 80° for producing a beam with a bandwidth less than 0.6 pm (see U.S. patent application Ser. No. 09/712,367, which is assigned to the same assignee as the present application and is hereby incorporated by reference). An output coupling interferometer including a pair of non-plane-parallel plates may also be used in addition to the beam expander and grating (which may have a blaze angle above or below 78°) of the ArF excimer laser for producing a 193 nm beam at a bandwidth below 0.6 pm and high spectral purity (see U.S. patent application Ser. Nos. 09/715,803 and 60/280,398, which are assigned to the same assignee as the present application and are hereby incorporated by reference).

Another specific embodiment includes a KrF excimer laser including an evacuatable narrow-band tuning module including a grating and a prism beam expander module with or w/o phase front correction optic(s). An interferometer, such as an etalon or as described above having non-plane-parallel plates, may be disposed within the line-narrowing module or as an output coupler for further line-narrowing. Other embodiments include a $F_2$ laser including an evacuatable narrow-band tuning module including a prism beam expander and a grating and/or an interferometer such as an etalon or as described above having non-plane-parallel plates for selecting a single line among the multiple closely-spaced emission lines around 157 nm of the $F_2$ laser. The selected line may be optionally further narrowed, e.g., using the same optic used for line-selection or another optic such as an interferometer. Dye lasers and tunable solid state lasers may be provided with evacuatable narrow-band modules, e.g., including a grating and beam expander with or without wavefront correction optic(s). In any of these above embodiments, the prism beam expander may be replaced with one including a lens or lenses or one or more reflective beam expanding optics.

Therefore, in accordance with a preferred embodiment, an excimer or molecular fluorine laser includes a discharge chamber filled with a gas mixture at least including a halogen-containing species such as molecular fluorine or HCL and a buffer gas, multiple electrodes within the discharge chamber connected to a pulsed discharge circuit for energizing the gas mixture, and a resonator having the discharge chamber and a line-narrowing module therein for generating a line-narrowed laser beam. The line-narrowing module has an evacuated atmosphere for suppressing gas density fluctuations within the line-narrowing module and for permitting the beam to propagate without substantial attenuation due to the presence of photoabsorbing species along the beam path. The laser may be an ArF, KrF, XeCl or $F_2$ laser, or may alternatively be a tunable dye laser or tunable solid state laser including excitation means modified from the above as understood by those skilled in the art.

The line-narrowing module may include a grating (having a blaze angle above or below 78°) and prism beam expander; or the grating, prism beam expander and wavefront compensation optic(s); or the grating, prism beam expander and interferometric device such as an etalon or a non-plane-parallel interferometric device (see above); or the grating, prism beam expander and interferometric device such as an etalon or a non-plane-parallel interferometric device (see above), and wavefront compensation optic(s); or an interferometric device such as an etalon or a non-plane-parallel interferometric device (see above); or an interferometric device such as an etalon or a non-plane-parallel interferometric device (see above) and a prism beam expander; or an interferometric device such as an etalon or a non-plane-parallel interferometric device (see above), prism beam expander and wavefront compensation optic(s). In each case, the evacuatable module is prepared for laser operation with a pressure of less than 80 mbar, and preferably less than 5 mbar, and more preferably around 0.1 mbar or 50–200 milliTorr or less, and still better, less than around $10^{-3}$ mbar or 0.5 milliTorr or less, wherein the pressure to be used in any particular embodiment will depend on the requirements of the application to which the laser system is to be used.

Correspondingly, the degree of sophistication of the vacuum equipment used will depend on the degree of vacuum desired. For example, for 80 mbar or below and even for 5 mbar or below, a roughing pump may be used and the line-narrowing module may use viton O-rings and standard clamps and hosing. For greater vacuum such as 0.1 mbar to 10–3 mbar and below, a turbo pump may be used along with higher vacuum seals, e.g., metal seals, copper seals, and vacuum clamps and hosing may be used. The degree of vacuum together with the line-narrowing optic(s) used will be such as to satisfy the desired degree of spectral purity and/or bandwidth of the generated beam.

In the embodiment for maintaining the pressure not higher than 80 mbar, one or more line-narrowing optics may include a grating and preferably a beam expander comprising one or more and preferably multiple prisms for expanding the beam. An aperture may be disposed between the laser chamber and the line-narrowing module and an aperture may be disposed between the laser chamber and a partially reflecting output coupler. The vacuum port may be continuously open to the line-narrowing module to maintain the pressure not higher than 80 mbar, and/or the line-narrowing module may include a vacuum-tight block.

Figure 6:
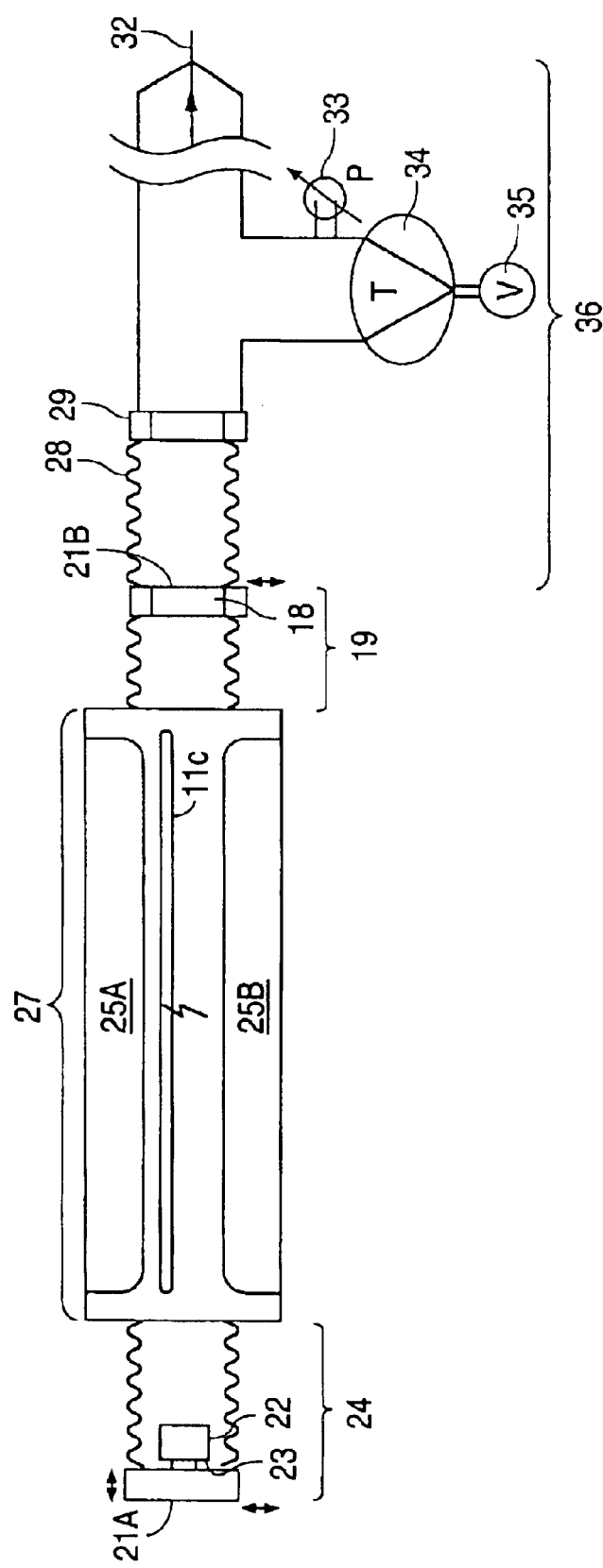
FIG. 6 schematically illustrates an industrial laser resonator including line-narrowing module with prepared atmosphere and extracavity beam path enclosure according to a preferred embodiment.
Figure 8:
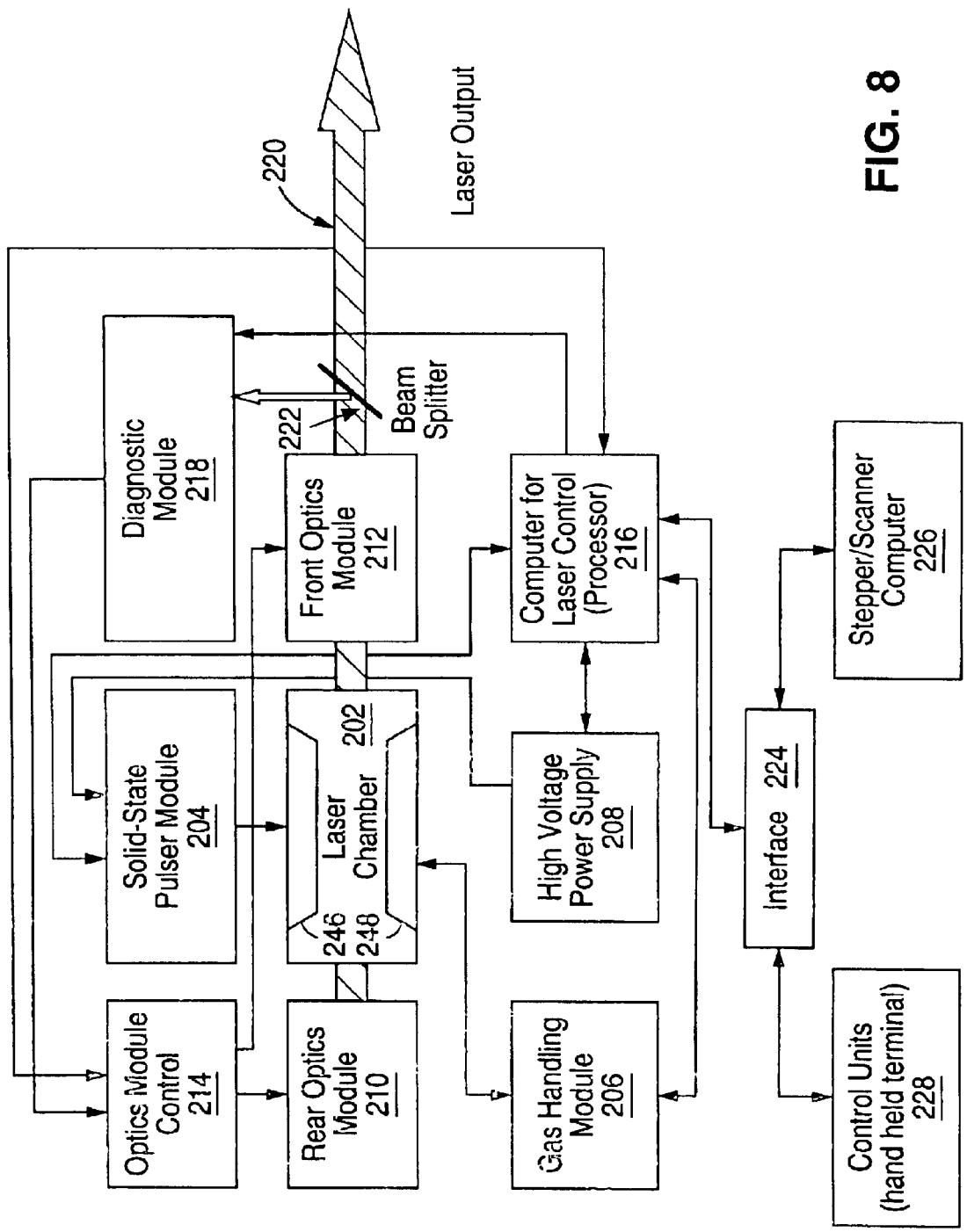
FIG. 8 schematically illustrates an overall excimer or molecular fluorine laser system according to a preferred embodiment.

FIG. 6 schematically illustrates a resonator including line-narrowing module 24 with resonator reflector mirror 23 and alignment mount 21A within an evacuatable enclosure of the line narrowing module 24, discharge chamber 27 with main electrodes 25A and 25B and preionizer 11c (also containing heat exchanger and fan, among other components, see FIG. 8 and description), and further intracavity enclosure 19 sealed with output coupler 18 and alignment mount 21B, as well as an extracavity beam delivery enclosure 28 preferably including galvanic separation mount 29 and other components 32–26 (see below), of an industrial laser system, such as an excimer or molecular fluorine laser system, in accordance with a preferred embodiment. The enclosure 19 has an evacuated atmosphere in accordance with the above description.

According to a preferred embodiment, a beam delivery path is efficiently evacuated to less than, e.g., $10^{-3}$ millibar.

The beam delivery path is preferably evacuated to less than $10^{-3}$ everywhere outside the discharge chamber, particularly including within the line-narrowing module 24, and also between the chamber 27 and output coupler 18 and outside the resonator, e.g., in the enclosure 28 and/or along the beam path 32. This reduced pressure through efficient evacuation diminishes optical absorption via oxygen and other gas molecules in the air. Efficient evacuation also reduces reflective and absorptive losses as well as stray light losses from dust and other particles often present in unevacuated gas volumes such as ordinary air. Alternatively, a purge gas may be flowed to keep the beam path substantially free of photoabsorbing species. When it is desired that a purge gas be flowed within the line-narrowing module 24, it is still preferred to have a gas pressure of 80 mbar or below, and preferably 5 mbar or below, and as mentioned, preferably 0.1 to $10^{-3}$ mbar or below.

Whether the laser is a broadband excimer laser or a $F_2$ laser emitting several discrete lines or a tunable dye laser or solid state laser, line-narrowing and/or line-selection optics may be used to reduce the bandwidth to a desired width, e.g., less than 1 pm or less than 0.6 pm. Such bandwidths may be required for a reason specific to the nature of the laser arrangement or output beam characteristics, or to the nature of the material processing or experimentation being performed using the laser arrangement. These line-narrowing and/or line-selection optics 22 are preferably contained with the line-narrowing module 24 of the laser system of the preferred embodiment. This line-narrowing module 24 is installed with the laser system and includes an evacuatable optics block for reducing the pressure in the line-narrowing module 24 to a selected pressure, such as 5 mbar or below, or as low as 0.5 mTorr or below. The $F_2$-laser arrangement, for example, includes additional line selection optics for operation at a narrow wavelength around one of two or more closely-spaced output emission lines. ArF and KrF excimer lasers in general are an example that, due to their characteristically broad spontaneous emission spectrum, typically utilize additional line-narrowing and tuning optics 22 in many applications.

At various points along the beam delivery path, within the resonator and outside the resonator, or the discharge chamber which encloses the laser active medium, it is desirable or typical to separate one volume from another. For example, the laser active gas is enclosed within its own volume to prevent its escape and to avoid its degradation. However, the resonating beam passes through the gas volume of the discharge chamber 27 and into a separated volume, e.g., enclosing an evacuatable optics block. In that case, the beam passes through a window between the two volumes.

The excimer or molecular fluorine laser of FIG. 6 includes a discharge chamber 27 including main electrodes 25A and 25B and preionizer 11c. The discharge chamber serves to excite $F_2$ molecules into an excited molecular state for the $F_2$ laser or rare gas atoms to combine with halogen ions in excited states for the ArF, XeCl and KrF lasers. The discharge chamber 27 is located within a resonator defined between a highly reflective surface 23 and an outcoupling mirror 18. An evacuated laser beam path 36 is shown outside the resonator including a galvanic separation component 29.

UV-preionization of the electrical discharge laser, including the electrode 11c of FIG. 6, is also provided and may be realized by means of an array of spark gaps or by another source of UV-radiation (surface, barrier or corona gas discharges), disposed in the vicinity of at least one of the solid electrodes of the main discharge of the laser. Preferred preionization units are described in U.S. patent application Ser. Nos. 09/247,887, 09/863,931, 09/532,276 and 09/692,265, which are assigned to the same assignee as the present application and are hereby incorporated by reference.

At left in FIG. 6 is a line-narrowing module 24 for selecting one of two closely-spaced lines of a F2-laser around 157 nm, or for narrowing the broadband emission of the ArF or KrF excimer lasers around 193 nm and 248 nm, respectively. The line-narrowing module 24 comprises at least one dispersive optical element, e.g., a grating, dispersive prism and/or interferometric device such as an etalon or device with non-plane-parallel plates, and preferably a beam expander. A typical arrangement might include a grating, or one or more prisms and a highly reflective mirror, or one or more prisms and a grating, etc.

The line-narrowing module 24 is orientationally adjustable using a first alignment mount 21A, which is preferably an adjustable holder for setting a desired wavelength. Preferably, the alignment mount 21A may be used to adjust the orientation of the line-narrowing and/or line-selection optics 22 in three translational directions and/or in both spherically rotational directions. Optical elements of the line-narrowing module 24, such as a mirror and/or a grating are adjusted in order to build an optical resonator together with the output mirror 30. A standard mirror mount can be used as this first alignment mount 21A. For line selection and/or tuning, at least one optical element of the line-narrowing module 24 is rotated. This can be done using a motordrive or drive unit such as, e.g., a stepping motor or a D.C. motor).

One preferred technique is the following. A base plate of the mirror mount of a first alignment mount 21A and a motor drive unit are located outside the laser gas of the discharge chamber 27 within the line-narrowing module 24. Metal bellows are attached to the discharge chamber 27 and adjustable plate. The motor drive unit controls the position of the rear adjustable mounting plate.

A base plate of the mirror mount of a second alignment mount 21B and a motor drive unit are located outside the laser gas of the discharge chamber 27 within the enclosure 19. An adjustable plate of the mirror mount is equipped with the partially reflecting mirror 18. Two metal bellows are attached to the adjustable plate. The other ends of the metal bellows are attached to the laser tube 27, and respectively to the galvanic separation component 29 of the evacuated or purged beam path enclosure 36. These bellows are preferably leak tight and over- and under-pressure resistant. The same holds for the sealing of the metal bellows against the adjustable mirror mount plate. The rear optical mount with the motor for wavelength tuning and/or selection is designed in the same way. One metal bellow may be used between the laser tube and the adjustable mount plate. The motor drive unit may be used to control the position of the front adjustable mounting plate.

The outcoupled beam from the excimer or molecular fluorine laser resonator traverses a segment of evacuated laser beam path 36. A short distance from the outcoupling unit 18 is an electrically insulating component 29 inserted into the beam path 36 for galvanic separation of the discharge chamber 27 from the rest of the beam path 36. The galvanic separator 29 preferably comprises a ceramic material.

Between the end of the line-narrowing module 24, which includes the wavelength selection unit 22 and highly reflective resonator reflector surface, and the discharge chamber 27, and also between the discharge chamber 27 and the galvanic separation component 29, is preferably anti-vibration hardware 28. The anti-vibration hardware 28 preferably comprises flexible or diaphragm bellows to neutralize vibration. Standard vacuum components may be used throughout the system for maintaining the vacuum throughout the beam delivery path outside the discharge chamber 27. Any flanges may comprise, e.g., Klein-Flange components. A roughing pump 35 backed turbomolecular pump 34, e.g., may be connected through an integral T-valve to the beam delivery path 32, wherein the pressure is monitored using a standard gauge 33 and preferably stabilized and maintained at a constant when the output beam is being used for photolithography or other fabrication or research. A line to the line-narrowing module 24 may be include for pumping with the same arrangement 34, 35, or another similar arrangement may be used for pumping the line-narrowing module 24.

Figure 7:
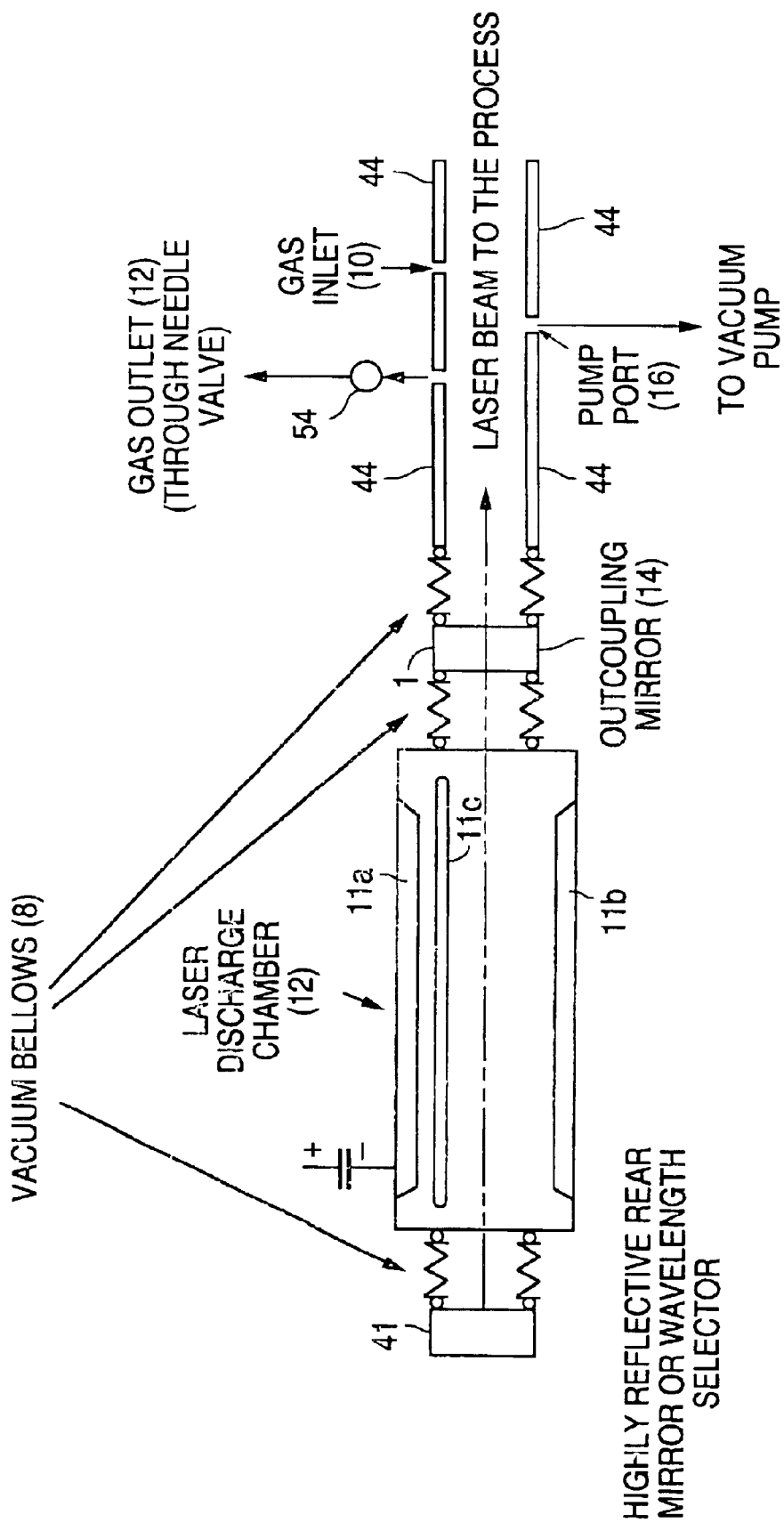
FIG. 7 schematically illustrates an industrial laser resonator including line-narrowing module with prepared atmosphere and extracavity beam path enclosure according to another preferred embodiment.

FIG. 7 schematically illustrates an industrial laser resonator including line-narrowing module 41 according to a preferred embodiment, or alternatively a highly reflective mirror, e.g., if the wavelength selection and/or narrowing optics are at the front optics module 51 (see U.S. patent application Ser. Nos. 091718,809 and 09/738,849, which are assigned to the same assignee as the present application and are hereby incorporated by reference) or within the laser gas (see the '065 patent, mentioned above). The line-narrowing module 41 has a prepared atmosphere which is preferably evacuated to less than 80 mbar, less than 5 mbar or less than $10^{-3}$ mbar, depending on the application, and extracavity beam path enclosure 44 according to another preferred embodiment.

The laser chamber 10 includes a heat exchanger and fan, and is filled with a gas mixture preferably at least including a halogen-containing species, such as $F_2$ or HCl, and a buffer gas, and may also include an active rare gas such as Ar, Kr or Xe. The chamber has at least electrodes 11a, 11b and 11c connected to a discharge circuit for energizing the gas mixture including preionizer 11c and main electrodes 11a and 11b. The extracavity enclosure 44 is shown at FIG. 7 including a gas inlet 50, a gas outlet 52, with or without needle valve 54, and a pump port 56, for pumping and/or flowing purge gas through. Although not shown, the line-narrowing module preferably has at least a pump port and may also include an inert gas inlet and may also include an inert gas outlet. The same is preferred for the front optics module 51, particularly if line-narrowing optic(s) are included therein.

Preferred procedures fopr preparing any of the beam path enclosures 41, 51 and/or 44, and/or corresponding enclosures described herein such as enclosure 1 of FIG. 3 or enclosures 24, 19 and/or 28 of FIG. 6, for operation of a laser system according to a preferred embodiment. Note that the preferred laser system includes a processor for controlling and coordinating various components. The procedure for preparing the beam path, in accord with a preferred embodiment, may be manually- or processor-controlled. If a processor is used, vacuum gauge and gas flow meter readings would be inputs. The processor would generate output signals for controlling the opening and closing of the pump port 56 and the purging gas inlet(s) 50 and outlet(s) 52 and the flow control of the valve 54. The preferred methods particularly apply for the module 41 or other module 51 containing the line-narrowing optics, even though the ports 50, 52 and 56 are shown connected only to the extra-cavity enclosure 44 in FIG. 7.

A preferred method includes first, closing the gas inlet 50 and outlet 52. Second, opening the pump port 56, and pumping down the enclosure 44 (and/or 41 and/or 51, which will be presumed below and not repeated) with, e.g., a 50 milliTorr vacuum pump until the vacuum gauge indicates that a predetermined residual pressure has been reached within the enclosure 44, e.g., 100–200 milliTorr, or lower. In a preferred embodiment, the enclosure 44 is pumped down to around 0.5 Torr using a 3 or 4 stage diaphragm pump or a turbomolecular pump backed by a rotary roughing pump. Next, the pump port 56 is closed off, the inlet port 50 is opened and the enclosure 44 is filled with inert gas flowing in through the inlet port 50 until approximately atmospheric pressure or higher is reached in the enclosure 44. Then, the inlet port 50 is again closed and the pump port 56 opened to repeat the evacuation procedure. These steps of evacuating the enclosure 44 followed by back-filling the enclosure 44 with inert gas are preferably repeated several times.

After these several gas flushing cycles, the gas inlet 50 and gas outlet 52 are each closed and the pump port 56 remains open to maintain the vacuum in the enclosure. Alternatively, all ports 50, 52 and 56 may be closed if the vacuum can be held depending on the seals and other vacuum equipment used. Further alternatively, the pump port 56 may be closed and both the gas inlet 50 and gas outlet 52 may be opened. This third alternative may be used only when a sufficiently low pressure can be maintained while still flowing the inert gas. For example, the inert gas may be flowed when only an 80 mbar or lower vacuum is desired, and may be possible when only a 5 mbar or less vacuum is desired, and would involve greater care when a less than $10^{-3}$ vacuum is desired. The extra-cavity enclosure may have a gas flow at a selected flow rate, preferably around 0.1 liters per minute, established and maintained in the enclosure 44 through control of the flow control valve 54, wherein the pressure is now maintained around atmospheric pressure or slightly higher. At the same time, a vacuum is maintained in the line-narrowing module 41 and/or 51. That is, the different enclosures 41, 51 and 44 may be handled differently.

The purge gas may include nitrogen and/or a noble gas of sufficiently high purity, e.g., more than 99.5% and preferably more than 99.9% or another purity such as 99.999%, 99.99999%, 99.9999999% etc., depending on the needs of the application. Note that the transmittance of the beam will increase with the number of flushes (indicating a reduced amount of photoabsorbing species with each flush), but becomes asymptotic to its highest value in as few as eight flushing cycles. Of course, more than eight flushing cycles may nonetheless be used. For helium, e.g., close to 99% transmittance can be achieved with eight flushes.

Using cycles of evacuating and filling the enclosure 41, 51 and/or 44 of FIG. 7 is preferred prior to pumping to high vacuum as this reduces the amount of absorbing species at a drastically reduced preparation time, and also minimizes inert gas consumption compared with merely flowing an inert gas to flush out the impurities. Otherwise, the beam path may be merely evacuated. In this case, a relatively low pressure vacuum would be used and a more sophisticated pumping system and high vacuum components would be used. For example, ultrahigh vacuum (UHV) pumping equipment and techniques may be used for achieving a pressure below 100 millitorr. Such equipment and techniques combine a tight enclosure with high pumping capacity. In this evacuation approach, transmission along the optical beam path enclosure would be determined by the absorption of radiation by "residual" gases, mainly oxygen, water vapor and hydrocarbons which may remain despite the evacuation, e.g., particularly attached to the interior walls of the enclosure.

Preferred and alternative embodiments described below further provide means of minimizing variations of sensitivity of VUV laser energy monitor due to absorption, as well as reducing fluctuations in refractive index from gas density fluctuations tending to reduce spectral purity, particularly in the line-narrowing module 1, 24, 41 of the laser system. The former is generally achieved by providing a hermetic enclosure which is preferably purged with an inert gas and then pumped to low pressure.

The laser resonator including the laser chamber 10, 27 containing the laser gas mixture includes optics module 11, 24, 41 preferably including line-narrowing optics for a line narrowed excimer or molecular fluorine laser, which may be replaced by a high reflectivity mirror or the like if line-narrowing is performed at the front optics module 14, 19, 51. Exemplary line-narrowing optics of the optics module 1, 24, 41 include a beam expander, an optional etalon and a diffraction grating, which produces a relatively high degree of dispersion, for a narrow band laser such as is used with a refractive or catadioptric optical lithography imaging system.

OVERALL LASER SYSTEM

FIG. 8 schematically illustrates an overall excimer or molecular fluorine laser system according to a preferred embodiment which preferably includes the advantageous features described above with reference to FIGS. 1–7. Referring to FIG. 8, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) industrial application, e.g., particularly for use with a lithography system. Alternative configurations for laser systems for use in such other industrial applications as TFT annealing, photoablation, reticle writing, mask writing, IC or wafer inspection and/or micromachining, e.g., include configurations understood by those skilled in the art as being similar to and/or modified from the system shown in FIG. 8 to meet the requirements of that application. For this purpose, alternative DUV or VUV laser system and component configurations are described at U.S. patent application Ser. Nos. 09/244,554, 09/512,417, 09/599,130, 09/694,246, 09/712,877, 09/574,921, 09/738,849, 09/718,809, 09/629,256, 09/712,367, 09/771,366, 09/715,803, 09/738,849, 09/791,431, 60/204,095, 09/741,465, 09/574,921, 09/734,459, 09/741,465, 09/686,483, 09/584,420, 09/843,604, 09/780,120, 09/792,622, 09/791,431, 09/811,354, 09/838,715, 09/715,803, 09/717,757, 09/771,013, 09/791,430, 09/712,367, 09/780,124, 10/035,351 and 10/001,954, and U.S. Pat. Nos. 6,345,065, 6,298,080, 6,285,701, 6,226,307, 6,272,158, 6,327,284, 6,269,110, 6,327,290, 6,324,196, 6,005,880, 6,061,382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

DISCHARGE TUBE

The system shown in FIG. 8 generally includes a laser chamber 202 (or laser tube including a heat exchanger and fan for circulating a gas mixture within the chamber 202 or tube) having a pair of main discharge electrodes 203 and a preionizer (not shown) each connected with a solid-state or thyratron pulser module 204, and a gas handling module 206. The gas handling module 206 has a valve connection to the laser chamber 202 so that halogen, any active rare gases and a buffer gas or buffer gases, and optionally a gas additive, may be injected or filled into the laser chamber, preferably in premixed forms (see U.S. patent application Ser. Nos. 09/513,025, 09/780,120, 09/734,459 and 09/447,882, which are assigned to the same assignee as the present application, and U.S. Pat. Nos. 4,977,573, 4,393,505 and 6,157,662, which are each hereby incorporated by reference. The solid-state pulser module 204 is powered by a high voltage power supply 208. A thyratron pulser module may alternatively be used. The laser chamber 202 is surrounded by optics module 210 and optics module 212, forming a resonator. The optics modules 210 and 212 may be controlled by an optics control module 214, or may be alternatively directly controlled by a computer or processor 216, particular when line-narrowing optics are included in one or both of the optics modules 210, 212, such as is preferred when KrF, ArF or $F_2$ lasers are used for optical lithography.

PROCESSOR CONTROL

The processor 216 for laser control receives various inputs and controls various operating parameters of the system. A diagnostic module 218 receives and measures one or more parameters, such as pulse energy, average energy and/or power, and preferably wavelength, bandwidth, E95 or other spectral parameter, and pressure readings for the enclosures 210, 212, or otherwise as described above. The parameter may be measured by spitting off a portion of the main beam 220 via optics 222 for deflecting a small portion of the beam toward the module 218, such as preferably a beam splitter module 222. The beam 220 is preferably the laser output to an imaging system (not shown) and ultimately to a workpiece (also not shown) such as particularly for lithographic applications, and may be output directly to an application process. The laser control computer 216 may communicate through an interface 224 with a stepper/scanner computer, other control units 226, 228 and/or other external systems.

The processor or control computer 216 receives and processes values of some of the pulse shape, energy, ASE, energy stability, energy overshoot for burst mode operation, wavelength, spectral purity, pressure and/or bandwidth, among other input or output parameters of the laser system and output beam. The processor 216 may receive signals corresponding to wavefront compensation such as values of the bandwidth, and may control the wavefront compensation performed by a wavefront compensation optic in a feedback loop by sending signals to adjust the pressure(s) and/or curvature(s) of surfaces associated with the wavefront compensation optic. The processor 216 also controls the line narrowing module, and/or valves, pumps, etc. of the vacuum system, to tune the wavelength and/or bandwidth or spectral purity, and controls the power supply and pulser module 204 and 208 to control preferably the moving average pulse power or energy, such that the energy dose at points on the workpiece is stabilized around a desired value. In addition, the computer 216 controls the gas handling module 206 which includes gas supply valves connected to various gas sources. Further functions of the processor 216 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 8, the processor 216 preferably communicates with the solid-state or thyratron pulser module 204 and HV power supply 208, separately or in combination, the gas handling module 206, the optics modules 210 and/or 212, the diagnostic module 218, and an interface 224. The laser resonator which surrounds the laser chamber 202 containing the laser gas mixture includes optics module 210 including line-narrowing optics for a line narrowed excimer or molecular fluorine laser, which may be replaced by a high reflectivity mirror or the like in a laser system wherein, e.g., line narrowing is performed at the front optics module 212, and/or a spectral filter external to the resonator is used for narrowing the linewidth of the output beam.

SOLID STATE PULSER MODULE

The laser chamber 202 contains a laser gas mixture and includes one or more preionization units (not shown) in addition to the pair of main discharge electrodes 203. Preferred main electrodes 203 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units may be sliding surface or corona-type and are described U.S. patent application Ser. Nos. 09/922,241 and 09/532,276 (sliding surface) and Ser. Nos. 09/692,265 and 09/247,887 (corona discharge), each of which is assigned to the same assignee as the present application, and additional alternative embodiments are set forth at U.S. Pat. Nos. 5,337,330, 5,818,865, 5,875,207 and 5,991,324, and German Gebrauchsmuster DE 295 21 572 U1, all of the above patents and patent applications being hereby incorporated by reference.

The solid-state or thyratron pulser module 204 and high voltage power supply 208 supply electrical energy in compressed electrical pulses to the preionization and main electrodes 203 within the laser chamber 202 to energize the gas mixture. Components of the preferred pulser module and high voltage power supply are described above, and further details may be described at U.S. patent application Ser. Nos. 09/640,595, 09/838,715, 60/204,095, 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

RESONATOR, GENERAL

The laser resonator which surrounds the laser chamber 202 containing the laser gas mixture includes optics module 210 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 212, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described above with reference to the Ser. Nos. 09/715,803 and 60/280,398 applications, wherein the same optic or optics or an additional line-narrowing optic or optics for narrowing the selected line may be used. Also, particularly for the $F_2$-laser, and also possibly for other excimer lasers, the total gas mixture pressure may be lower than conventional systems, e.g., lower than 3 bar, for producing the selected line at a narrow bandwidth such as 0.5 pm or less, and for the $F_2$ laser, without using additional line-narrowing optics in some applications (see U.S. patent application Ser. No. 60/212,301, which is assigned to the same assignee as the present application and is hereby incorporated by reference).

The laser chamber 202 is sealed by windows transparent to the wavelengths of the emitted laser radiation 220. The windows may be Brewster windows or may be aligned at another angle, e.g., 5°, to the optical path of the resonating beam. One of the windows may also serve to output couple the beam or as a highly reflective resonator reflector on the opposite side of the chamber 202 as the beam is outcoupled.

DIAGNOSTIC MODULE

After a portion of the output beam 220 passes the outcoupler of the optics module 212, that output portion preferably impinges upon a beam splitter module 222 which includes optics for deflecting a portion of the beam to the diagnostic module 218, or otherwise allowing a small portion of the outcoupled beam to reach the diagnostic module 218, while a main beam portion 220 is allowed to continue as the output beam 220 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 218. A holographic beam sampler, transmission grating, partially transmissive reflection diffraction grating, grism, prism or other refractive, dispersive and/or transmissive optic or optics may also be used to separate a small beam portion from the main beam 220 for detection at the diagnostic module 218, while allowing most of the main beam 220 to reach an application process directly or via an imaging system or otherwise. These optics or additional optics may be used to filter out visible radiation such as the red emission from atomic fluorine in the gas mixture from the split off beam prior to detection.

The output beam 220 may be transmitted at the beam splitter module while a reflected beam portion is directed at the diagnostic module 218, or the main beam 220 may be reflected, while a small portion is transmitted to the diagnostic module 218. The portion of the outcoupled beam that continues past the beam splitter module 222 is the output beam 220 of the laser, which propagates toward an industrial or experimental application such as an imaging system and workpiece for photolithographic applications.

The diagnostic module 218 preferably includes at least one energy detector. This detector measures the total energy of the beam portion that corresponds directly to the energy of the output beam 220 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 222 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 218 is preferably a wavelength and/or bandwidth detection component such as a monitor etalon or other interferometric device (see above) or grating spectrometer, and a hollow cathode lamp or reference light source for providing absolute wavelength calibration of the monitor etalon or grating spectrometer (see U.S. patent application Ser. No. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831, 6,269,110, 6,272,158 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 216 and optics control modules 210, 212, gas handling module 206, power supply and pulser modules 203, 204, or other laser system component modules. For example, the total pressure of the gas mixture in the laser tube 202 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

BEAM PATH ENCLOSURE

Particularly for the molecular fluorine laser system, and also for the ArF and KrF laser systems, multiple enclosures (not shown at FIG. 8, but see FIGS. 3 and 6–7) preferably seal the beam path of the beam 220 such as to keep the beam path free of photoabsorbing or other contaminant species that can tend to attenuate and/or otherwise disturb the beam such as by providing a varying refractive index along the optical path of the beam. Smaller enclosures preferably seal the beam path between the chamber 202 and the optics modules 210 and 212 and between the beam splitter 222 and the diagnostic module 218 (see the U.S. Pat. Nos. 6,345,065 and 6,327,290 patents and the Ser. Nos. 09/598,552 and 09/712,877 applications, incorporated by reference above). The optics modules 210 and 212 are maintained in an atmosphere that is sufficiently evacuated and/or have an inert gas purged atmosphere, as described above. Features of the preferred enclosures are described above and some additional features may be described in detail also at U.S. patent application Ser. Nos. 09/727,600 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

GAS MIXTURE

The laser gas mixture is initially filled into the laser chamber 202 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent application Ser. Nos. 09/513,025, 09/447,882, 09/789,120 and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

GAS REPLENISHMENT

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 202 of, e.g., 100 liters, total pressure adjustments and gas replacement procedures may be performed using the gas handling module 206 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214, 6,243,406 and 5,396,514 and U.S. patent application Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 202 may also be performed. Total pressure adjustments may be followed by gas composition adjustments if it is determined that, e.g., other than the desired partial pressure of halogen gas is within the laser tube 202 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 206 connected to the laser tube 202 either directly or through an additional valve assembly, such as may include a small compartment for regulating the amount of gas injected (see the '459 application), may include a gas line for injecting a premix A including 1%$F_2$:99% Ne or other buffer gas such as He, and another gas line for injecting a premix B including 1% rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 202 via the valve assembly, the fluorine concentration in the laser tube 202 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary microhalogen injections, such as between 1 milliliter or less and 3–10 milliliters, or more depending on the degree of stability desired, and any and all other gas replenishment actions are initiated and controlled by the processor 216 which controls valve assemblies of the gas handling unit 206 and the laser tube 202 based on various input information in a feedback loop. These gas replenishment procedures may be used in combination with gas circulation loops and/or window replacement procedures to achieve a laser system having an increased servicing interval for both the gas mixture and the laser tube windows.

LINE NARROWING

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm, 0.5 pm, 0.4 pm or less). These exemplary embodiments w may be used along with a wavefront compensating optic (see, e.g., U.S. patent application Ser. No. 09/960,875, which is assigned to the same assignee as a the present application and is hereby incorporated by reference). For the $F_2$ laser, the optics may be used for selecting the primary line $\lambda_1$ only of multiple lines around 157 nm, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 09/883,128, which is assigned to the same assignee and is hereby incorporated by reference). Line-narrowing of the broadband emission of the ArF and/or KrF lasers may be as set forth below.

Exemplary line-narrowing optics contained in the optics module 210 include a beam expander, an optional interferometric device such as an etalon or a device having a pair of opposed non-planar reflection plates such as may be described in the Ser. No. 09/715,803 or 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 210, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 210. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 210 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

ADDITIONAL LASER SYSTEM FEATURES

Optics module 212 preferably includes means for outcoupling the beam 220, such as a partially reflective resonator reflector. The beam 220 may be otherwise outcoupled such as by an intra-resonator beam splitter or partially reflecting surface of another optical element, and the optics module 212 would in this case include a highly reflective mirror. The optics control module 214 preferably controls the optics modules 210 and 212 such as by receiving and interpreting signals from the processor 216, and initiating realignment, gas pressure adjustments in the modules 210, 212, or reconfiguration procedures (see the '353, '277, and '554 applications, and the '470 and '065 patents, each mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 202 following a new fill procedure. In addition, gas injection actions such as µHIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 202. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at excimer or molecular fluorine laser wavelengths such as 248 nm for the KrF laser, 193 nm for the ArF laser and 157 nm for the $F_2$ laser. The materials are also capable of withstanding long-term exposure to ultraviolet light with minimal degradation effects. Examples of such materials are $CaF_2$, $MgF_2$, $BaF_2$, LiF and $SrF_2$, and in some cases fluorine-doped quartz may be used, and for the KrF laser, fused silica may be used. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations includes either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent application Ser. Nos. 09/599,130 and 60/228,184, which are assigned to the same assignee and are hereby incorporated by reference. The amplifier may be the same or a separate discharge chamber 202. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

Figure 9:
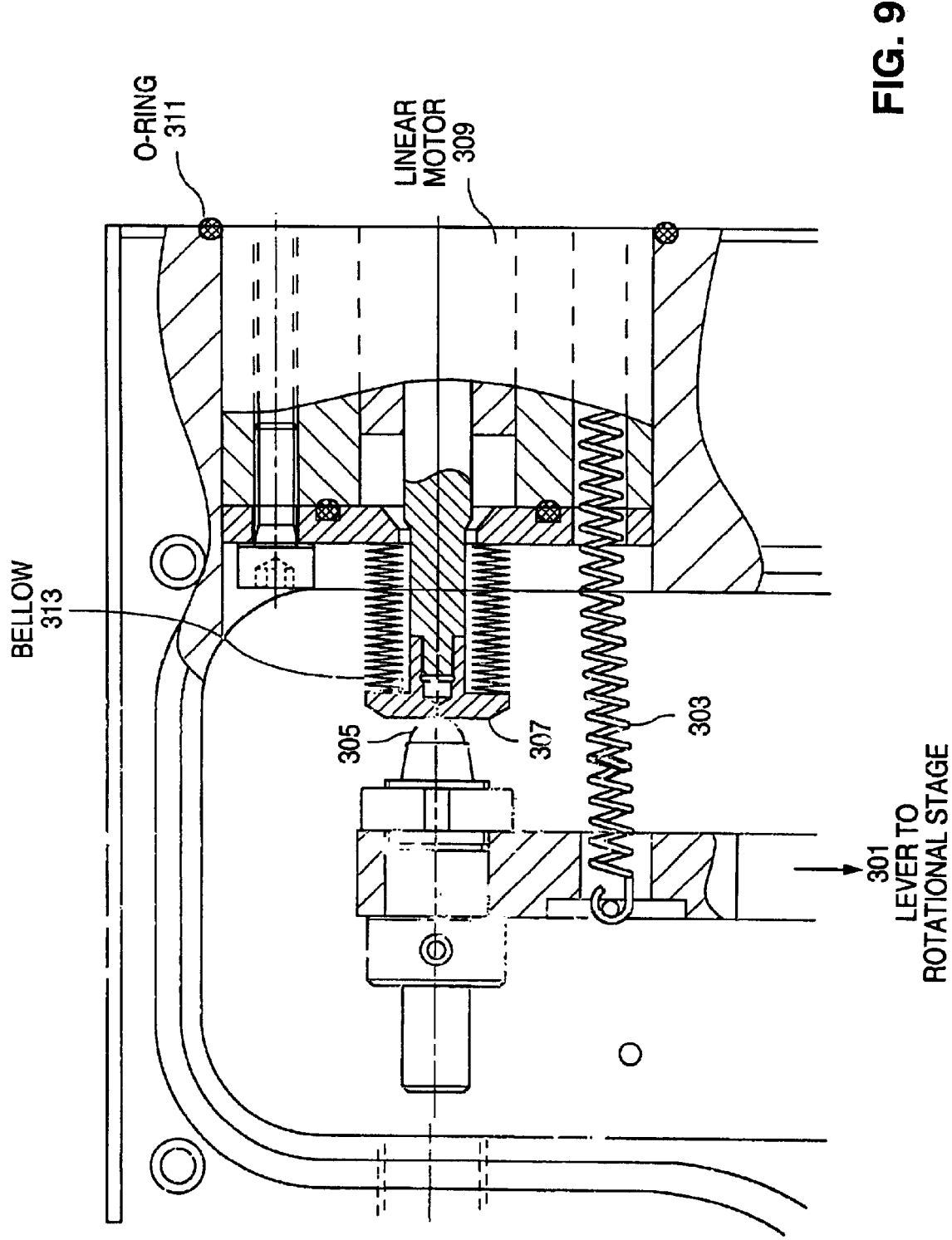
FIG. 9 schematically illustrates a tunable line-narrowing module according to a preferred embodiment.

In addition, and in particularly accordance with a preferred embodiment, one or more line-narrowing and/or selection optics may be tuned by rotation according to the exemplary configuration of FIG. 9. A lever 301 is coupled to a rotational stage (not shown) having the optic mounted thereon. The lever 301 is within the evacuated line-narrowing module, e.g., the rear optics module 210, of the resonator. The lever is supported by a spring 303 which holds a knob end 305of the lever 301 tight against a motor drive flange 307. The motor drive flange 307 adjusts in either direction by force applied by a linear motor 309 to rotate the lever 301 and turn the optic in either direction. By turning the optic, the wavelength output by the laser may be tuned. The motor drive 307, 309 sealably feeds into the evacuated line-narrowing module 210 using o-rings 311 and a bellow 313. Therefore, the linear motor 309 is coupled by the bellow 313 to the lever 301 of the optics block. An advantage is that impurities are prevented from moving into the line-narrowing module from the linear motor 309. More than one of the configurations of FIG. 9 may be used, e.g., for more than one optic, and two or more may be rotated synchronously (see, e.g., U.S. patent application Ser. No. 09/244,554, which is assigned to the same assignee as the present application and is hereby incorporated by reference). Further features of the tuning mechanics of the line-narrowing module may be described at U.S. patent application Ser. No. 09/878,133, which is assigned to the same assignee as the present application and is hereby incorporated by reference.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. The invention is therefore not limited by any of the description of the preferred embodiments, and is instead defined by the language of the appended claims, and structural and functional equivalents thereof.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

What is claimed is:

1. An excimer or molecular fluorine laser system, comprising:
    a laser chamber filled with a gas mixture at least including a halogen-containing species and a buffer gas;
    multiple electrodes, including a pair of main discharge electrodes and at least one preionization electrode, within the laser chamber and connected to a discharge circuit for energizing the gas mixture, wherein the energized gas mixture generates a discharge energy;
    a resonator, optically coupled with to laser chamber to receive the discharge energy, including a line-narrowing and/or selection module which receives the discharge energy and generates a laser beam at high spectral purity, wherein the line-narrowing module includes one or more line-narrowing and/or selection optics within a sealed module, and
    a vacuum physically coupled to the line-narrowing module through a vacuum port, and the vacuum operates to reduce the pressure within the module to not higher than 1 mbar such that refractive index fluctuations due to density fluctuations of gases in the module are substantially suppressed and for suppressing absorption by contaminant species in the beam path.

2. The laser system of claim 1, wherein the one or more line-narrowing optics include a grating.

3. The laser system of claim 2, wherein the one-or more line-narrowing optics further include a beam expander.

4. The laser system of claim 3, wherein the beam expander includes one or more prisms for expanding the beam.

5. The laser system of claim 1, wherein an aperture is disposed between the laser chamber and the line-narrowing module.

6. The laser system of claim 5, wherein an aperture is disposed between the laser chamber and a partially reflecting output coupler of the laser resonator.

7. The laser system of claim 1, wherein the vacuum port is continuously open to the line-narrowing module to maintain the pressure less than 1 mbar.

8. The laser system of claim 1, wherein the line-narrowing module includes a vacuum-tight block.

9. The laser system of claim 1, wherein at least one of the one or more line-narrowing and/or selection optics is rotated by a lever which is moved by a motor drive which feeds through to move the lever by a bellow and otherwise sealed feedthrough to prevent contaminants from entering the line-narrowing and/or selection module.

10. An excimer or molecular fluorine laser system, comprising:
    a laser chamber filled with a gas mixture at least including a halogen-containing species and a buffer gas;
    a pair of main discharge electrodes disposed within the laser chamber and connected to a discharge circuit for energizing the gas mixture, wherein the energized gas mixture generate a discharge energy;
    a resonator, optically coupled with the laser chamber to receive the discharge energy, including a line-narrowing and/or selection module for generating a laser beam at high spectral purity, wherein the line-narrowing module includes one or more line-narrowing and/or selection optics within a sealed module, and
    a vacuum physically coupled to the line-narrowing through a vacuum port, and the vacuum operates to reduce the pressure within the module to less than 1 mbar such that refractive index fluctuations due to density fluctuation of gases in the module are substantially suppressed and for suppressing absorption by contaminant species in the beam path.

11. The laser system of claim 10, wherein the one or more line-narrowing and/or selection optics include a grating.

12. The laser system of claim 11, wherein the one or more line-narrowing and/or selection optics include a beam expander.

13. The laser system of claim 12, wherein the one or more line-narrowing and/or selection optics include an interferometric device.

14. The laser system of claim 13, wherein the one or more line-narrowing and/or selection optics include a wavefront compensation optic.

15. The laser system of claim 10, wherein the one or more line-narrowing and/or selection optics include an interferometric device.

16. The laser system of claim 15, wherein the interferometric device includes a pair of non-plane-parallel plates.

17. The laser system of claim 15, wherein the one or more line-narrowing and/or selection optics include a beam expander.

18. The laser system of claim 17, wherein the one or more line-narrowing and/or selection optics include a wavefront compensation optic.

19. The laser system of claim 15, wherein the one or more line-narrowing and/or selection optics include a wavefront compensation optic.

20. The laser system of claim 10, wherein refractive index fluctuations are maintained less than $10^{-6}$.

21. The laser system of claim 10, wherein at least one of the one or more line-narrowing and/or selection optics is rotated by a lever which is moved by a motor drive which feeds through to move the lever by a bellow and otherwise sealed feedthrough to prevent contaminants from entering the line-narrowing and/or selection module.

22. An excimer or molecular fluorine laser system; comprising:

a laser chamber filled with a gas mixture at least including a halogen-containing species and a buffer gas;

multiple electrodes, including a pair of main discharge electrodes and at least one preionization electrode, within the laser chamber and connected to a discharge circuit for energizing the gas mixture, wherein the energized gas mixture generates a discharge energy;

a resonator, optically coupled with the laser chamber to receive the discharge energy, including a line-narrowing and/or selection module for generating a laser beam at high spectral purity, wherein the line-narrowing module includes one or more line-narrowing and/or selection optics within a sealed module, and a vacuum physically coupled to the line narrowing module through a vacuum port, and the vacuum operates to reduce the pressure within the module to $10^{-3}$ mbar or less such that refractive index fluctuations,due to density fluctuations of gases in the module are substantially suppressed and for suppressing absorption by contaminant species in the beam path.

23. The laser system of claim 22, further comprising an extra-cavity beam enclosure having a prepared atmosphere for suppressing absorption by contaminant species in the extra-cavity beam path.

24. The laser system of claim 23, further comprising a galvanic separation component along the extra-cavity beam enclosure.

25. The laser system of claim 24, wherein the galvanic separation component comprises ceramic.

26. The laser system of claim 22, further comprising enclosures between the laser chamber and each of the line-narrowing module and an output coupler of the laser resonator to maintain corresponding beam paths substantially free of photoabsorbing species.

27. The laser system of claim 26, wherein the enclosures comprise metal bellows as anti-vibration and pressure-sealing hardware.

28. The laser system of claim 22, wherein the laser system is a $F_2$ laser system and the one or more line-narrowing and/or selection optics for selecting one of multiple closely-spaced lines around 157 nm.

29. The laser system of claim 28, wherein the one or more line-narrowing and/or selection optics include an interferometric device.

30. The laser system of claim 29, wherein the one or more line-narrowing and/or selection optics include a beam expander.

31. The laser system of claim 28, wherein the one or more line-narrowing and/or selection optics include a dispersive prism.

32. The laser system of claim 31, wherein the one or more line-narrowing and/or selection optics include a beam expander.

33. The laser system of claim 22, wherein at least one of the one or more line-narrowing and/or selection optics is rotated by a lever which is moved by a motor drive which feeds through to move the lever by a bellow and otherwise sealed feedthrough to prevent contaminants from entering the line-narrowing and/or selection module.

34. An excimer or molecular fluorine laser system, comprising:

a laser chamber filled with a gas mixture at least including a halogen-containing species and a buffer gas;

multiple electrodes, including a pair of main discharge electrodes and at least one preionization electrode, within the laser chamber and connected to a discharge circuit for energizing the gas mixture, wherein the energized gas mixture generates a discharge energy;

a resonator, optically coupled with the laser chamber to receive the discharge energy, including a line-narrowing and/or selection module for generating a laser beam at high spectral purity, and wherein the line-narrowing module includes one or more line-narrowing and/or selection optics within a sealed module physically coupled to vacuum equipment through a vacuum port for reducing the pressure within the module, and wherein at least one of the one or more line-narrowing and/or selection optics is rotated by a lever which is moved by a motor drive which feeds through to move the lever by a bellow and otherwise sealed feedthrough to prevent contaminants from entering the line-narrowing and/or selection module.

35. The laser system of claim 34, wherein the one or more line-narrowing and/or selection optics are selected from the group consisting of a grating, a beam expander, an interferometric device and a wavefront compensation optic.

* * * * *